United States Patent [19]
Walker

[11] Patent Number: 6,121,953
[45] Date of Patent: Sep. 19, 2000

[54] VIRTUAL REALITY SYSTEM FOR SENSING FACIAL MOVEMENTS

[75] Inventor: Chris Walker, Venice, Calif.

[73] Assignee: Modern Cartoons, Ltd., Venice, Calif.

[21] Appl. No.: 08/795,544

[22] Filed: Feb. 6, 1997

[51] Int. Cl.[7] .................................................. G09G 5/00
[52] U.S. Cl. .......................... 345/156; 382/118; 382/308; 345/473; 2/421
[58] Field of Search .................................. 345/156, 7, 8, 345/425, 473, 330; 364/526, 566; 348/39, 36, 42; 359/350, 815; 600/485, 587; 559/630; 463/36; 382/276, 118, 308, 103; 2/421

[56] References Cited

U.S. PATENT DOCUMENTS

| | | | |
|---|---|---|---|
| 3,658,054 | 4/1972 | Iberall | 600/485 |
| 4,141,652 | 2/1979 | Feinleib . | |
| 4,461,553 | 7/1984 | Doerr et al. . | |
| 4,725,138 | 2/1988 | Wirth et al. . | |
| 5,016,282 | 5/1991 | Tomono et al. . | |
| 5,089,914 | 2/1992 | Prescott | 359/815 |
| 5,389,790 | 2/1995 | Honey et al. . | |
| 5,430,809 | 7/1995 | Tomitaka . | |
| 5,481,622 | 1/1996 | Gerhardt et al. | 382/118 |
| 5,507,716 | 4/1996 | Jang et al. . | |
| 5,553,864 | 9/1996 | Sitrick . | |
| 5,555,090 | 9/1996 | Schmutz . | |
| 5,572,749 | 11/1996 | Ogden . | |
| 5,635,947 | 6/1997 | Iwamoto | 345/7 |
| 5,689,575 | 11/1997 | Sako et al. | 382/103 |
| 5,704,836 | 1/1998 | Norton et al. | 463/36 |
| 5,712,732 | 1/1998 | Street | 359/630 |

*Primary Examiner*—Richard A. Hjerpe
*Assistant Examiner*—Francis Nguyen
*Attorney, Agent, or Firm*—Kenneth L. Sherman, Esq.; Sherman & Sherman

[57] ABSTRACT

A system for manipulating a computer generated animation in real time that includes a head mount configured to inhibit relative movement between the head mount and head of a wearer is provided. The head mount is coupled to a computer that processes data generated by the head mount in real time. Data generated by the facial movements of a wearer of the head mount is processed in real time so that an object, such as a cartoon in a virtual reality program, has facial expressions analogous to the facial expressions of the wearer, as the wearer is performing. A plurality of cameras monitor different localized regions of the wearer's face for sensing movements in these regions to generate data indicating movement. The cameras are attached to the head mount with flexible arms for precise positioning of the cameras. The cameras monitor each of the mouth, chin and cheek, and an eyebrow and forehead regions of the wearer's face and one of the wearer's eyes. A portion of reflective material adhered to the wearer's face in each of the monitored regions enhances the camera's ability to generate data indicative of the changing facial expressions of the wearer. While the facial expressions of the wearer are changing, data representative of the changing expressions is continuously processed, so the cartoon has facial expressions that continuously mimic the wearer's.

21 Claims, 4 Drawing Sheets

VIRTUAL REALITY SYSTEM FOR SENSING FACIAL MOVEMENTS

FIELD OF THE INVENTION

The present invention relates generally to virtual reality systems, and more particularly, to a system for tracking the facial movements of a wearer and integrating the data generated by the system into virtual reality in a real time environment.

BACKGROUND OF THE INVENTION

Virtual reality ("VR") systems are computer generated systems that provide the experience of a simulated environment that forms a three dimensional virtual world. These VR systems are used in many different applications including commercial flight simulators, entertainment systems, computer games and video arcade games, to name a few.

In most virtual reality systems a participant typically wears a head-mounted device that enables sensory receiving a virtual reality world generated by the computer. The system also includes an interaction means, such as a pointing device or specially configured glove containing sensors and actuators, for interacting with objects in the virtual world. In some sophisticated systems, a full body suit, also containing sensors and actuators, may be additionally provided so that the user can influence and has a realistic feel of objects in the virtual world.

Computer generated animation is an increasingly prevalent media form. Computer generated animation is currently being used in such applications as creating full-length motion pictures, crime reenactments, and short length films, such as children's cartoons. However, a disadvantage of known computer generated animation, is that the animation is programmed into the computer to form a cartoon or other animation, similar to a draftsman drawing cells in a cartoon strip, prior to the animation being run for display. Further, it is well known that cartoons, as opposed to film or television scenes, are driven by the speech or sound information instead of the speech or the sound being driven by the actor's performances or other visual information common in most film or video media. This sound driven characteristic of cartoons precludes any real time visual interaction either from an external source with the sound of visual information or even as between the sound information and the visual information.

It is further a disadvantage of known computer generated animation is unnatural because the animated characters are without real time elaborate facial expressions. It is also not possible to have interaction with the computer animation while the animation is being shown. Therefore it would be advantageous to provide a system for interacting with computer animation in "real time", wherein a participant can interact with the animation while the animation is running.

One means for interacting with animation in real time, would be to provide a data input means that transmits appropriate data to a computer while the computer is simultaneously displaying and running the animation. The data received by the computer could then be integrated into the running animation for altering the animation in real time.

U.S. Pat. No. 5,507,716, to LeBerge et al. discloses equipment and methods used to induce lucid dreams in sleeping persons. The disclosed equipment and methods include a number of features prevalent in virtual reality systems. The system includes a headband having a face mask. The face mask contains two infrared emitter detector pairs, one detector pair for sensing eye movements and the other detector pair for sensing body movements. A state-test button and components that produce low intensity sensory stimuli, such as light and sound are also included in the disclosed face mask. A microprocessor is providing for monitoring fluctuations in voltages from the infrared detector pairs for the occurrence of a predetermined sequence of voltages. When the correct sequence occurs, the microprocessor triggers the stimuli producing components in the mask into activity, to cue the sleeper to become lucid.

U.S. Pat. No. 5,553,864, to Sitrick, is directed to a video game adapter interface apparatus that has a user input device and an associated video display. A user selects a distinguishable visual image representation for association into a video game's audiovisual presentation. Each user is identified by the image they select. Color, size graphics, or shape can be used to distinguish users. In one embodiment, a digitized image of each user's face is used as the distinguishable representation. Alternatively, each user can create an original image or select one of a predetermined set of visual images as the user's identification. The adapter is preferably coupled to a video game system and a storage card containing user images. The system then integrates the selected user image from the storage card into the video game's audiovisual presentation and can also integrate the user image into the video game play.

A further disadvantage of known virtual reality systems is that the headsets common therein are prone to moving about on a wearer's head. This can be disadvantageous if the wearer's head is providing any data. Movement of the headset relative to the wearer's head would cause generation of inaccurate data.

U.S. Pat. No. 5,572,749, to Ogden discloses a helmet mounting device for use in a virtual reality system that allows a helmet to be securely mounted on a user's head in a desired alignment, without irritating chin straps. The disclosed helmet includes a liner with a retention figured to be quickly mounted on, or removed from the head of the wearer, for applications such as theme parks. However, a disadvantage of the disclosed helmet, is that it may still be substantially prone to movement about on the head of the wearer.

There exists a need for a system for carefully manipulating computer generated animation in real time that includes a head mount configured to inhibit relative movement between the head mount and head of a wearer.

There further exists a need for a system that allows accurate data input into a virtual reality system form a user's head.

OBJECTS OF THE INVENTION

It is therefore an object of the present invention to provide a system for manipulating a computer generated animation in real time;

It is another object of the present invention to provide a system for manipulating a computer generated animation in real time that includes a head mount configured to inhibit relative movement between the head mount and head of a wearer;

It is a further object of the present invention to provide a system for manipulating computer generated animation in real time that provides natural facial expressions to the animated characters;

It is even further an object of the present invention to provide a head mounted sensor input system which includes a head mount configured to track the movement of different facial regions of a wearer for generating data to manipulate a computer generated animation; and It is still another object of the present invention to provide a system for manipulating a computer generated animation in real time that includes a head mount that is substantially light.

SUMMARY OF THE INVENTION

These and other objects and advantages of the present invention are achieved by providing a system for manipulating computer generated animation in real time that provides for multiple sensors to detect elaborate facial expressions and manipulate computer animation in real time in conjunction with those facial expressions. The preferred embodiment of the present invention includes a head mount configured to inhibit relative movement between the head mount and head of a wearer. The preferred embodiment of the head mount is coupled to a computer through an umbilical data cable for processing data generated by the head mount in real time.

In the preferred embodiment of the present invention, data generated by the facial movements of a person ("Movement Data"), such as an actor, wearing the head mount is transmitted to the computer for processing the data in real time. The Movement Data is continuously processed so that an object, such as a cartoon figure in a virtual reality program running on the computer, has facial expressions analogous to the facial expressions of the actor, as the actor is performing.

Thus, a virtual reality computer generated character controlled by an actor wearing the head mount in the system of the preferred embodiment of the present invention, is capable of conversing with a human interviewee, in an interview situation for example, with the appearance that the human is actually interacting with the cartoon, as though the cartoon were another human. Additionally, peripheral means may be provided for enhancing the facial expressions of the cartoon.

The head mount of the preferred embodiment of the present invention is especially configured to inhibit relative movement between the head mount and head of the wearer for preventing the generation of incorrect data. The head mount includes a helmet portion having a rigid brow portion configured to engage the frontal region and forehead of the wearer's head to inhibit movement therebetween. Also included is a headband that extends about the occipital region of the head of the wearer and preferably is adjustable so that the head mount may be securely worn by wearers with various different head sizes.

A data transmission frame secured to the helmet portion and coupled to the data cable is provided for coupling the head mount to the computer. The helmet portion and frame preferably comprise a suitable lightweight and rigid material so that the head mount is substantially light, weighing approximately one pound.

The system of the preferred embodiment of the present invention includes a plurality of preferably infrared sensitive cameras for monitoring several different localized regions of the wear's face for sensing movements in each of these regions, as opposed to the prior art wherein only a single camera is provided for sensing the entire face. In the preferred embodiment, a camera is provided for monitoring each of the mouth and chin region, the cheek region, and the eyebrow and forehead region of the wearer's face. A fourth camera monitors pupil movement and blinking of one of the wearer's eyes.

Each of the cameras is attached to a positionable flexible arm for coupling the cameras to the umbilical data cable. The positionable arms enable precise positioning of the desired camera above the localized region of the wearer's face to be monitored, while maintaining the position of the camera. Each of the cameras is preferably provided with a light emitting source adjacent to the lens thereof. The light sources of each of the cameras illuminate the adjacent region of the wearer's face to enhance the camera's ability to sense movement in the region to generate the Movement Data indicative of facial expressions.

In the preferred embodiment of the invention, a reflective material is adhered to the wearer's face in each of the monitored regions. As the facial expressions of the wearer change due to their talking or intentionally making scripted facial expressions, the reflective material reflects light emitted by the light source of the adjacent camera into the lens of the camera for generating data indicative of movement (the "Movement Data") in the region. The camera monitoring the wearer's eye generates Movement Data indicating pupil movement and blinking. The data from each of the cameras is simultaneously transmitted to the computer in real time, for continuously changing the facial expressions and eye movement of the object in real time.

In the preferred embodiment of the present invention, a database is initially designed which contains the information necessary to support the animated image. The Movement Data generated by the preferred head mount then interacts with and manipulates the animation database to provide an altered image of facial expression.

Therefore, while the wearer's facial expressions are changing, the Movement Data representative of the changing expressions is continuously transmitted to the computer and processed thereby for enabling the cartoon figure to have continuously changing facial expressions and eye movements that mimic the actor's. There is no relative movement between the head mount and the wearer's head. The actor can move freely about, even dance, without inaccurate data being generated by the cameras. The configuration of the head mount does not encumber the wearer, while the lightness thereof enables the head mount to be worn some time without fatiguing the neck and shoulders of the wearer.

Additionally, the head mount may be provided with a microphone. The microphone enables an actor wearing the head mount to do a complete virtual reality performance, without the need to have the actor separately record a voice performance or to have another actor perform the voice portion of the virtual reality interaction.

In the preferred embodiment, the adjustable mini video cameras are filtered to accept a narrow bandwidth of infrared light sources that illuminate 3M reflective materials that adhere to the face. The reflective spots are tracked in x and y real time through image processing and reported to a data collector PC. There are four cameras in one face tracker. One of the four is dedicated to eye tracking, and the other three are concentrating on the eyebrow and mouth areas. The head set is extremely light weight and can be worn simultaneously by the performer in the body suit. The system converts x, y motion data in real time to a set of morphing three dimensional geometric face sculptures (databases) that combine into a single real time computer generated rendered head of a character with an infinite number of variations to produce lip sync and facial expressions.

BRIEF DESCRIPTION OF THE DRAWINGS

The above and other features, organizations, advantages and objects of this invention will be fully understood from the following detailed description and the accompanying drawings. Each of the drawings contained herein are not considered to be accurate depictions of the embodiments of the invention, but are provided for illustrative purposes only and are to be interpreted in conjunction with the attached specification.

DETAILED DESCRIPTION OF THE PREFERRED EMBODIMENT

The following description is provided to enable any person skilled in the art to make and use the invention and sets forth the best modes presently contemplated by the inventor of carrying out the invention. Various modifications, however, will remain readily apparent to those skilled in the art, since the generic principles of the present invention have been defined herein.

Figure 1:
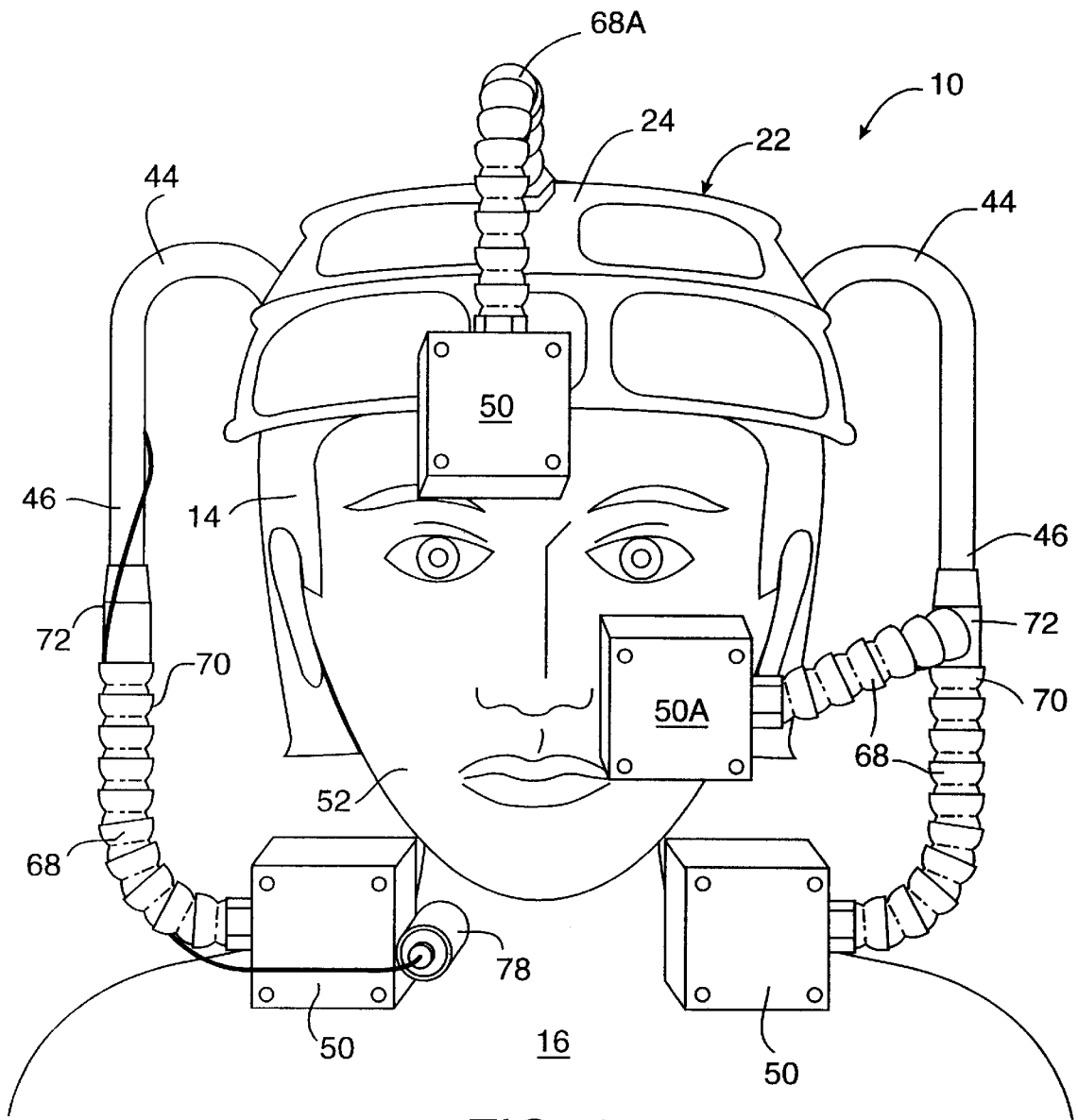
FIG. 1 is a front elevational view of a preferred embodiment of a head mount for a system for manipulating a computer generated animation in real time of the present invention.
Figure 2:
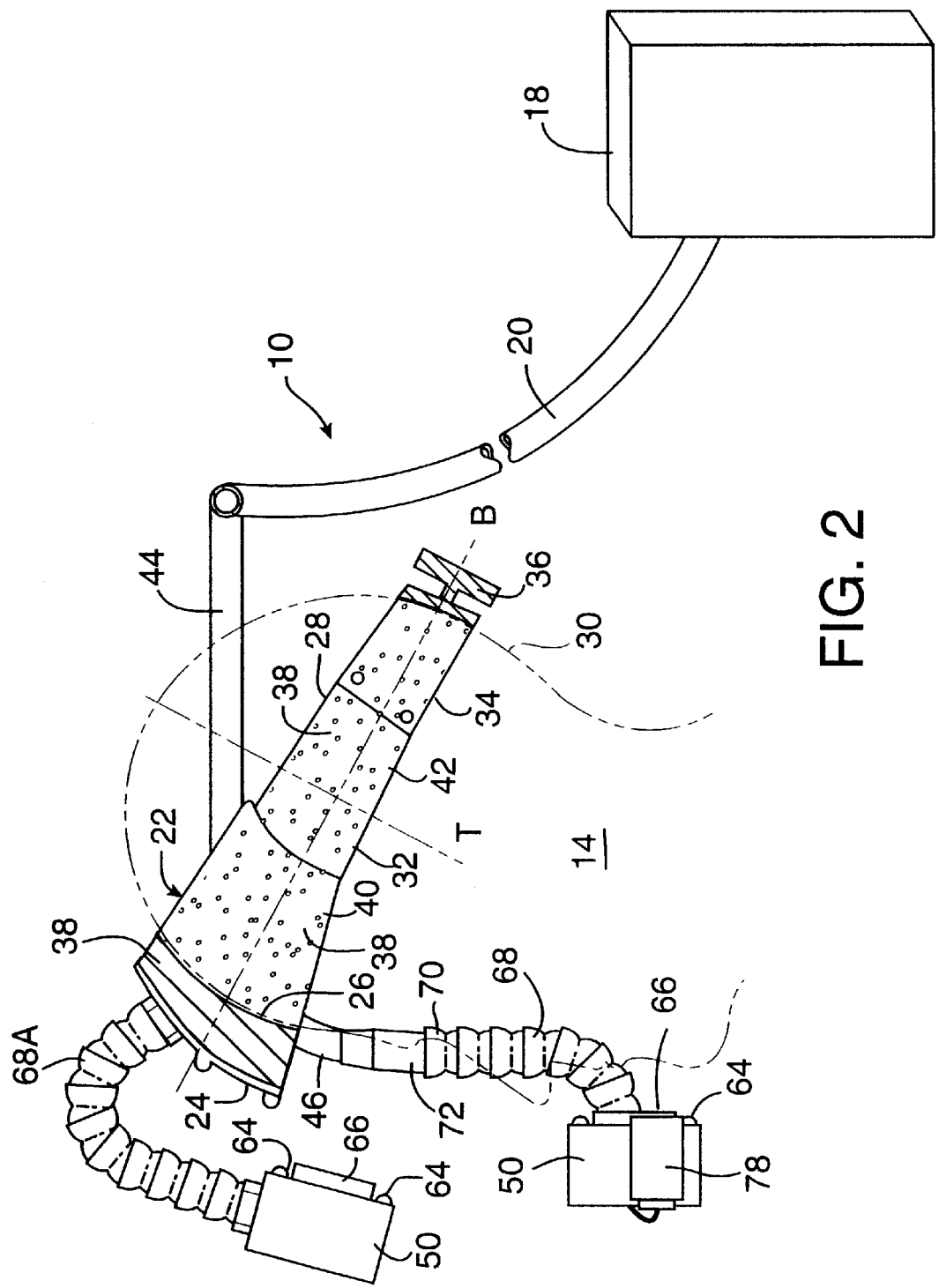
FIG. 2 is a side elevational, cross-sectional view of the preferred embodiment of the invented head mount showing the head mount as worn by the user.
Figure 3:
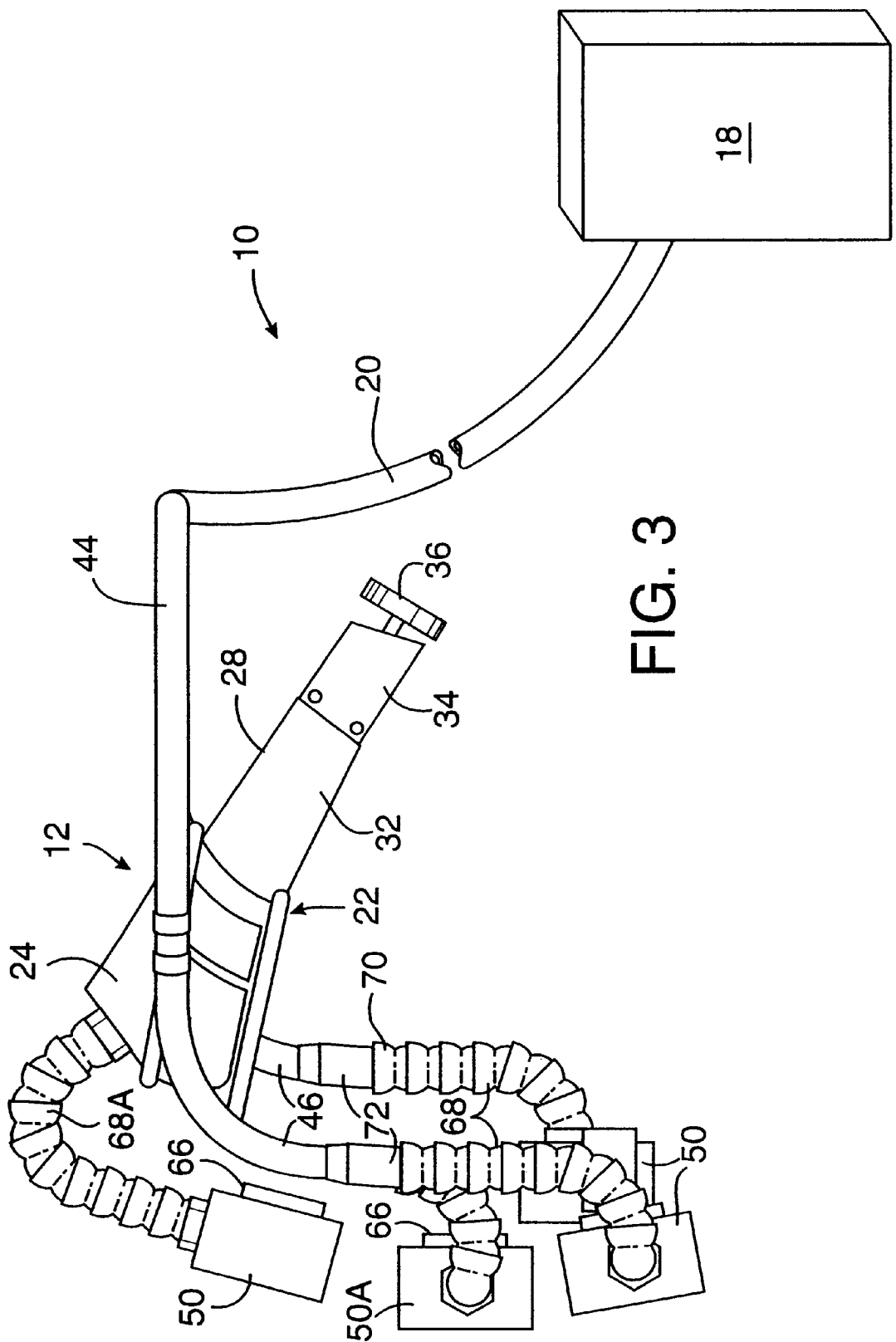
FIG. 3 is a side elevational view of the head mount of the present invention.

Referring now to FIGS. 1–3 of the drawings, there is shown, generally at 10, a preferred embodiment of a system for manipulating computer generated animation in real time that includes a head mount 12 constructed according to the principles of the present invention. The invented head mount 12 is preferably configured to inhibit relative movement between the head mount 12 and head 14 of a wearer 16. The invented system 10 comprises the head mount 12 coupled to a computer 18 through an umbilical data cable 20 for processing data generated by the head mount 12 in real time.

In the system 10 of the present invention, Movement Data generated by the facial movements of the wearer 16, such as when the wearer is an actor, are transmitted to the computer 18 for processing the data in real time. The Movement Data is continuously processed so that an object, such as a cartoon figure in a virtual reality program running on the computer 18, has facial expressions which correspond to and are analogous with the facial expressions of the actor 16, as the actor 16 is performing. A virtual reality cartoon controlled by the actor 16 wearing the head mount 12 in the invented system 10, is capable of conversing with a human interviewee, in an interview situation for example, with the appearance that the human is actually interacting with the cartoon, as though the cartoon were another human. Additionally, peripheral means (not shown) may be provided for enhancing the facial expressions of the cartoon.

Referring to FIGS. 1–3 of the drawings, in the preferred embodiment of the present invention the head mount 12 is configured to inhibit relative movement between the head mount 12 and head 14 of the wearer 16 for preventing the generation of incorrect data. The head mount 12 includes a helmet portion 22 having a rigid brow portion 24 configured to engage a frontal region and a forehead 26 (best seen in FIG. 2) of the wearer's head 14 to inhibit movement therebetween.

The rigid brow 24 is curved in a base plane B and in a transverse plane T that extends substantially perpendicularly to the base plane B, such that the brow 24 forms a compound curve that mates with the frontal region and forehead 26 of the wearer 16. The brow 24 is preferably molded from a suitable known strong, rigid, and a lightweight polymeric material and is fabricated using methods known in the art.

The helmet 22 further includes an adjustable headband 28 attached to the brow 24. The headband 28 is configured to extend about an occipital region 30 of the wearer's head 14 and preferably is adjustable for adjusting the circumference of the helmet 22 so that the head mount 12 may be securely worn by wearers with various different head sizes. The headband 28 comprises flexible bands 32 that are attached to the brow 24 and are affixed to interlocking adjusting straps 34. A knob 36 is coupled to the interlocked straps 34 and rotated either clockwise or counterclockwise for adjusting the length of the headband 28 for changing the circumference of the helmet 22.

In the preferred embodiment, a suitable foam padding 38 is affixed to an inner side 40 of the brow 24 and may be affixed to an inner side 42 of the bands 32. The padding 38 is provided to increase the coefficient of friction between the brow 24 and the wearer's forehead 26 to prevent the brow 24 from sliding about on the forehead 26. The padding 38 also absorbs perspiration and provides comfort for the wearer 16.

A data transmission frame 44 couples the head mount 12 to the computer 18. In the preferred embodiment, the data frame 44 comprises a hollow curvilinear tube that extends about the helmet 22 and is affixed to the brow 24. The frame 44 has ends 46 that terminate adjacent to the brow 24.

The data frame 44 preferably comprises a lightweight, rigid metal alloy, such as aluminum for example. The frame 44 and helmet 22, along with each of the components comprising the head mount 12, to be thoroughly discussed hereinafter, comprise substantially lightweight materials so that the head mount 12 has a preferred weight range of approximately 0.5 to 1.5 pounds. The low weight of the head mount 12 enables the head mount to be worn for some time without fatiguing the neck and shoulders of the wearer 16, while the configuration thereof does not encumber the wearer.

Referring now to the drawing figures, the preferred embodiment 10 of the present invention additionally includes a plurality of facial movement monitoring means 50. The monitoring means 50 continuously track movement in a plurality of localized regions of the wearer's face 52 for continuously generating facial expression Movement Data representative of the changing facial expressions of the wearer 16. In the preferred embodiment, a monitoring means 50 is provided for monitoring a cheek region 54, a mouth and chin region 56, and an eyebrow and forehead region 58. A fourth monitoring means 50A monitors an eye region 60 for monitoring pupil movement and blinking of one of the wearer's eyes 62.

Preferably, the monitoring means 50 comprise infrared sensitive cameras, such as those manufactured by Chinon Kabushiki Kaisha, Suwa, Japan, for monitoring the localized regions 54, 56, 58 of the wearer's face 52 for sensing movements in each of these regions to generate data indicative of facial expressions. The eye monitoring camera 50A continuously monitors the eye region 60 for generating data indicative eye movement and blinking. Additionally, the cameras 50 are configured with known low-pass filter means (not shown) for filtering out undesired ambient light.

Each of the cameras 50 are preferably provided with a plurality of light emitting sources 64 affixed adjacent to a lense 66 as close to the center of the lense without obstructing full viewing as possible. In the preferred embodiment of the invented system 10, the light emitting sources 64 comprise light emitting diodes 64 positioned about the lens 66 of each camera 50 for providing a focused light source to illuminate the adjacent facial regions 54, 56, 58, 60 to be monitored. The light sources 64 illuminate the adjacent region of the wearer's face 52 to enhance the camera's ability to detect movement in the monitored facial regions 54, 56, 58, 60 for generating representative facial expression and eye movement data.

In the current preferred embodiment of the present invention the eye monitoring camera 50A is provided with a plurality of LEDs 64, ranging from approximately 4 to approximately 8, for inundating the eye 62 with light. The large number of LEDs 64 are provided with the eye monitoring camera 50A, since pupil movement and blinking are monitored by the lack of light reflected into the lens 66 thereof.

Referring again to FIGS. 1–3 of the drawings, each of the cameras 50 is attached to a positionable flexible arm 68 for coupling the cameras 50 to the computer 18 via the umbilical data cable 20. The positionable arms 68 enable precise positioning of the desired camera 50 above the localized region 54, 56, 58, 60 to be monitored. The arms 68 have ends 70 attached to connectors 72 affixed to the ends 46 of the frame 44, with the arm 68A supporting the camera 50 monitoring the eyebrow and forehead region 58 attached to the brow 24.

The positionable arms 68 are hollow to provide an enclosed data line path from an output of cameras 50 through the arms 68 supporting the camera 50, through the hollow data frame 44, into the data cable 20, and to the computer 18, so that extraneous data lines do not interfere with the line of sight of the wearer 16 or with movements made thereby.

The positionable arms 68 preferably comprise a series of articulated ball and socket type couplings for positioning each of the cameras 50 above the desired region to be monitored and for maintaining the desired position. The arms 68 are fabricated from a suitable rigid polymeric material, such as Delrin®. The series of hollow articulated ball and socket type couplings comprising the arms 68 are often used for a modular adjustable coolant hose, and are sold under the trademark "Loc-Line", manufactured by Lockwood Products, Inc., Lake Oswego, Oreg.; and sold under the trademark "Snap-Loc", manufactured by Cedar Berg Corporation, Minnesota.

Figure 4:
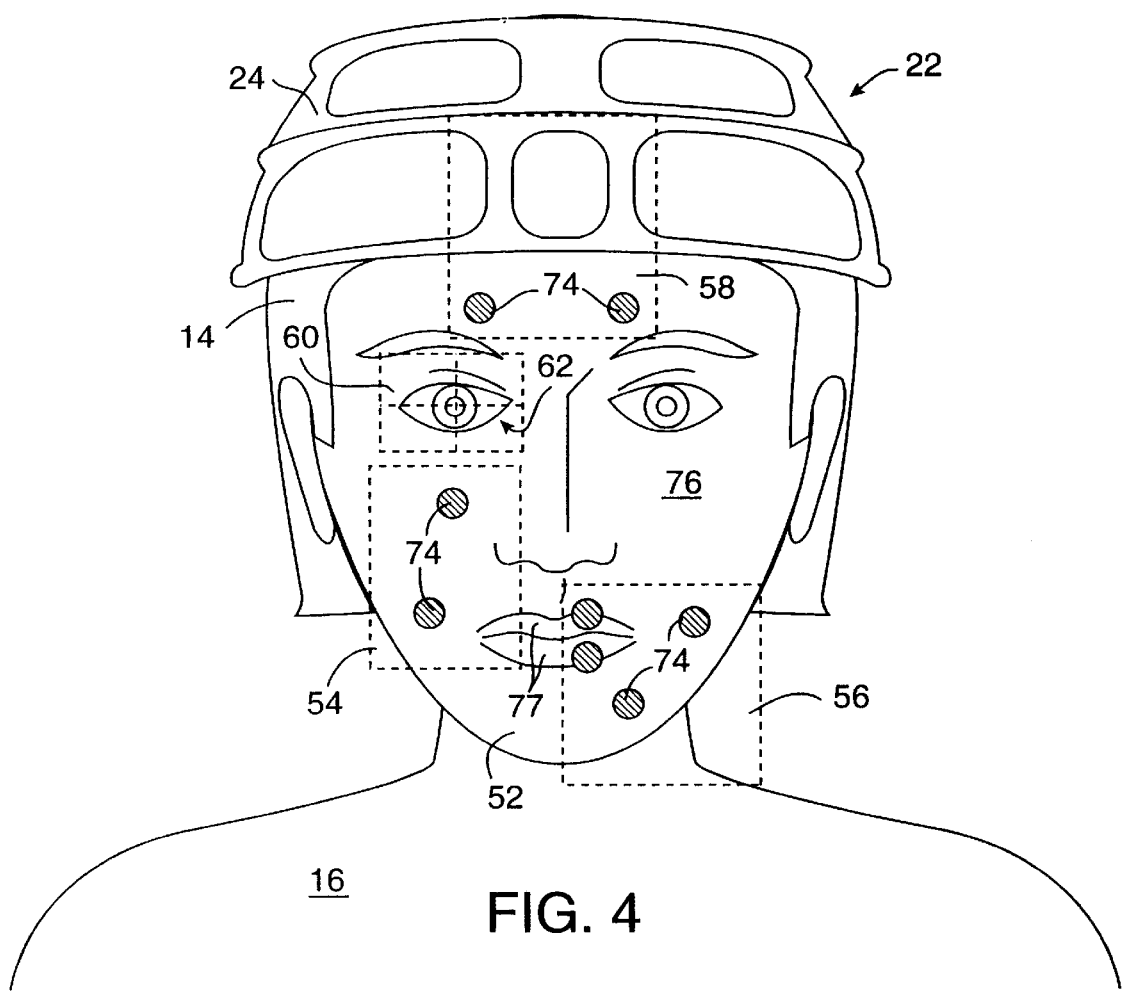
FIG. 4 is a front elevational view showing a plurality of localized regions of a wearer's face that are monitored for sensing movements in each of these regions for determining changing facial expressions of the wearer.
Figure 5:
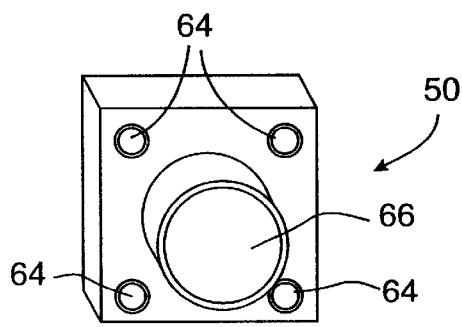
FIG. 5 is a front perspective view showing a facial movement detection means for monitoring movement in the localized facial regions of the preferred embodiment of the system of the present invention.

Referring now to FIG. 4, a plurality of epidermis position indicating means 74 are adhered to the epidermis 76 of the face 52 of a wearer 16 in each of the localized facial regions 54, 56, 58. Horizontal and vertical movement of the indicating means 74, indicates movement of the epidermis 76 to the adjacent camera 50 for indicating changing facial expressions.

When the wearer 16 is talking or intentionally making scripted facial expressions, such as growls or sneers for example, the indicating means 74 in one or more of the monitored regions 54, 56, 58 moves since the epidermis 76 moves due to the muscular contractions causing the facial expressions. As the indicating means 74 moves, light emitted by the light sources 64 are reflected into the lens 66 of the adjacent camera 50 to indicate the changing horizontal and vertical positions of the indicating means 74 for continuously generating Movement Data representative of the changing facial expressions.

In the preferred embodiment, each of the epidermis position indicating means 74 comprises a portion of reflective material, such as known reflective tape manufactured by Minnesota Mining and Manufacturing, Minnesota. One or more portions of the reflective tape 74 may be adhered to the wearer's face 52 in each of the monitored regions 54, 56, 58, depending upon such factors as the dimensions of the region to be monitored, expected or desired facial expressions to be made by the wearer 16, and desired portions of the region to be monitored, such as lips 77 for example.

Thus, facial expression Movement Data is continuously generated by each camera 50 monitoring the facial expressions and eye movements of the wearer 16 and continuously transmitted to the computer 18 via the data cable 20. The Movement Data is then processed by the computer in real time, for continuously interacting with the database (not shown) representative of expressions and eye movements corresponding to the movements of the wearer 16. Thus, the object in the virtual reality program running on the computer 18 has facial expressions analogous to the facial expressions of the wearer as they are occurring.

Referring again to FIG. 1 and FIG. 2, the head mount 12 may optionally be provided with an integrated microphone 78. The microphone 78 is provided to enable an actor 16 wearing the head mount 12 to do a complete virtual reality performance, without the need to have the actor 16 separately record a voice performance or to have another actor perform the voice portion of the virtual reality interaction. The microphone 78 is secured to a desired one of the cameras 50, preferably the camera 50 monitoring either the cheek region 54 or the mouth and chin region 56, as either of these cameras are positioned proximal to the actor's mouth.

Therefore, while the wearer's facial expressions are changing, the data representative of the changing expressions enables the cartoon figure to have continuously changing facial expressions and eye movements that mimic the actor's. Since there is no relative movement between the head mount and the wearer's head, the actor can move freely about, even dance, without inaccurate data being generated by the cameras.

Thus, there has been described a system for manipulating computer generated animation in real time that includes a head mount configured to inhibit relative movement between the head mount and head of a wearer. In the preferred embodiment of the invented system, Movement Data generated by the facial movements of the wearer is transmitted to the computer in real time for processing, so that an object, such as a cartoon figure in a virtual reality program running on the computer, has facial expressions analogous to the facial expressions of the wearer, while they are occurring.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A head mount for use in a virtual reality computer system, the head mount comprising:

a helmet for wearing the head mount on a head of a wearer, the helmet configured to engage the head for inhibiting relative movement therebetween and not occluding a forehead region of the wearer;

a plurality of facial movement detection means for monitoring movement in a plurality of facial regions, each of the detection means continuously sensing and generating movement data;

a plurality of positioning means for positioning each of the detecting means at one of the facial regions; and means for continuously transmitting the movement data to the computer system.

2. The system of claim 1 wherein the helmet includes means for adjusting the circumference of the helmet for inhibiting movement between the head of the wearer and the head mount.

3. The system of claim 1 wherein the facial movement detecting means comprises a plurality of light sensitive image reception means, the image reception means monitoring changes in the amount of light received and indicating corresponding changing positions of the wearer's epidermis.

4. The system of claim 1 further comprising at least one eye movement detecting means for continuously detecting eye movement and blinking of the wearer and for continuously generating movement data indicative of the eye movement and blinking.

5. The system of claim 1 wherein the means for transmitting further comprises a data cable for coupling the head mount to the computer system.

6. A head mount for use in a virtual reality computer system, the system including a computing means for continuously processing data generated by the head mount, the head mount comprising:

a helmet configured to inhibit relative movement between a head of a wearer and the head mount, the helmet including a brow portion configured to engage the frontal region and the forehead of the head to prevent movement therebetween and a means for adjusting a circumference of the helmet;

a plurality of facial movement detection means for monitoring movement in a plurality of facial regions, each of the detection means continuously sensing and generating movement data;

means for positioning each of the detection means; and means for transmitting the movement data to the computing means, the movement data being continuously processed so that a computer generated object in the computing means has computer generated facial expressions analogous to natural facial expressions of the wearer.

7. The system of claim 6 wherein the detection means further comprises an eye movement detection means for continuously detecting eye movement and blinking and continuously generating movement data indicative of eye movement and blinking.

8. The system of claim 7 further comprising light source means for illuminating the facial regions, the light source means enhancing the detection means' ability to sense movement in the facial regions and to produce corresponding computer generated facial expressions in the computer generated object.

9. The system of claim 7 wherein the brow portion is substantially rigid and configured to form a compound curve for mating with a top portion of the forehead of the head to inhibit movement therebetween; and the circumference adjusting means further comprising an adjustable headband affixed to above the brow portion and configured to extend about the wearer's head for adjusting the circumference of the helmet so that the head mount can accommodate different head sizes while being securely retained on each wearer's head.

10. The system of claim 8 wherein detection means are provided for monitoring at least the mouth, cheek, and forehead regions, and at least one eye.

11. The system of claim 10 wherein the positioning means comprise a plurality of positionable arms coupled to the helmet, the positionable arms provided to position each of the facial movement detection means at the desired facial region and for maintaining position of the detection means.

12. The system of claim 11 further comprising a data cable for coupling the facial movement detection means to the computing means to provide a data path therebetween, the detection means continuously transmitting movement data to the computing means via the data cable.

13. A head mount for use in a virtual reality computer system, the system including a computing means for continuously processing data generated by the head mount, the head mount comprising:

a helmet configured to inhibit relative movement between the head of a wearer and the head mount, the helmet portion including a rigid brow portion curved in a base plane and in a transverse plane extending substantially perpendicularly to the base plane, such that the brow portion forms a compound curve configured to mate with the frontal region and forehead of the head of the wearer to engage the wearer's head to inhibit movement therebetween, the helmet further including an adjustable headband attached to the brow portion and configured to extend about the occipital region of the wearer's head, the headband being adjustable for adjusting the circumference of the helmet so that the head mount may be dimensioned to accommodate different head sizes while securely retaining the head mount on each wearer's head;

a plurality of epidermis position indicating means adhered to the face of the wearer in a plurality of localized facial regions, movement of the indicating means indicating changing facial expressions;

a plurality of facial movement monitoring means for monitoring facial movements in the plurality of facial regions, each monitoring means continuously tracking movement of the adjacent position indicating means for continuously generating facial expression movement data representative of the changing facial expressions of the wearer;

an eye movement monitoring means for continuously monitoring eye movement and blinking in one eye of the wearer for continuously generating movement data indicative of eye movement and blinking;

light source means for illuminating the monitored regions of the wearer's face and for illuminating the wearer's monitored eye, the light source means enhancing the monitoring means ability to detect movement in the monitored facial regions and eye for generating representative facial expression and eye movement data;

a plurality of positionable flexible arms for precisely positioning each of the monitoring means above the desired facial region and eye to be monitored and for maintaining the monitoring means in the desired position; and means for transmitting the movement data generated by each of the monitoring means to the computing means, wherein facial expression and eye movement data generated by the monitoring means is continuously transmitted to the computing means for tracking the changing facial expressions and eye movements of the wearer for continuously processing the data so that an object in a virtual reality program running on the computing means has facial expressions and eye movements analogous to the facial expressions and eye movements of the wearer as they are occurring on the wearer's face.

14. The system of claim 13 further comprising:

each of the monitoring means comprising a camera for sensing light reflected into a lens thereof, each of the cameras monitoring the amount of light reflected into the lens thereof by the adjacent epidermis position indicating means to determine changes in the position of the indicating means for continuously generating facial expression data, the eye monitoring camera generating data indicative of eye movement and blinking due to the lack of light reflected into the lens thereof by the pupil of the eye; and each of the epidermis position indicating means comprising a portion of reflective material adhered to the face of the wearer, portions of reflective material adhered to the wearer in a plurality of localized facial regions selected from the group consisting of the mouth, chin, cheek, an eyebrow, and forehead regions, such that facial expression data is generated by facial movements in each of the plurality of monitored facial regions and eye movement data is generated by the eye monitoring camera for continuously generating data representative of the changing facial expressions and eye movements of the wearer so that the object has facial expressions analogous to the facial expressions of the wearer as they are occurring.

15. The system of claim 14 further comprising:

the cameras comprising infrared sensitive cameras which filter out excessive ambient light, and the light source means comprising a plurality of light emitting diodes affixed adjacent to the lens of each camera and positioned thereabout, the light emitting diodes providing a focused light source for illuminating the adjacent facial region to be monitored.

16. The system of claim 15 wherein a plurality of light emitting diodes are affixed adjacent to the lens of the eye monitoring camera and positioned thereabout for inundating the eye with light, the number of light emitting diodes ranging from approximately four to approximately eight diodes.

17. A head mount for use in a virtual reality computer system, the system including a computing means for continuously processing data generated by the head mount, the head mount comprising:

a helmet configured to inhibit relative movement between the head of a wearer and the head mount, the helmet portion including a rigid brow portion curved in a base plane and in a transverse plane extending substantially perpendicularly to the base plane, such that the brow portion forms a compound curve configured to mate with the frontal region and forehead of the head of the wearer to engage the wearer's head to inhibit movement therebetween, the helmet further including an adjustable headband attached to the brow portion and configured to extend about the occipital region of the wearer's head, the headband being adjustable for adjusting the circumference of the helmet so that the head mount may be dimensioned to accommodate different head sizes while securely retaining the head mount on each wearer's head;

a plurality of epidermis position indicating means adhered to the face of the wearer in a plurality of localized facial regions, movement of the indicating means indicating changing facial expressions;

a plurality of facial movement monitoring means for monitoring facial movements in the plurality of facial regions, each monitoring means continuously tracking movement of the adjacent position indicating means for continuously generating facial expression movement data representative of the changing facial expressions of the wearer;

an eye movement monitoring means for continuously monitoring eye movement and blinking in one eye of the wearer for continuously generating movement data indicative of eye movement and blinking;

light source means for illuminating the monitored regions of the wearer's face and for illuminating the wearer's monitored eye, the light source means enhancing the monitoring means ability to detect movement in the monitored facial regions and eye for generating representative facial expression and eye movement data;

a plurality of positionable flexible arms for precisely positioning each of the monitoring means above the desired facial region and eye to be monitored and for maintaining the monitoring means in the desired position;

means for transmitting the movement data generated by each of the monitoring means to the computing means, wherein facial expression and eye movement data generated by the monitoring means is continuously transmitted to the computing means for tracking the changing facial expressions and eye movements of the wearer for continuously processing the data so that an object in a virtual reality program running on the computing means has facial expressions and eye movements analogous to the facial expressions and eye movements of the wearer as they are occurring on the wearer's face; and a data transmission frame secured to the helmet portion, the data frame comprising a hollow tube extending about the helmet portion having ends terminating adjacent to the brow portion, the ends of the frame configured to couple to ends of the repositionable arms for coupling the cameras to the computing means via the data cable, the repositionable arms being hollow for providing an enclosed data line path from an output of each camera through the hollow arm supporting the camera, through the hollow data frame, into the data cable, and to the computing means so that extraneous data lines do not interfere with the line of sight of the wearer or with movements made by the wearer.

18. The system of claim 17 wherein the repositionable flexible arms each comprise a repositionable hollow tube comprising a series of articulated ball and socket type couplings for positioning each of the cameras above the desired region to be monitored and for maintaining the desired position.

19. The system of claim 18 wherein the brow portion comprises a rigid polymeric material and the data frame comprises a lightweight aluminum alloy so that the head mount ranges in weight from approximately 0.5 to 1.5 pounds.

20. A method for providing data to a virtual reality computer system, comprising the steps of:

creating a computer data base representative of a virtual image;

obtaining a plurality of movement data sets from a plurality of movement detection means, each movement data set representative of movement of one of a plurality of facial regions on a user's face;

interacting at least two of the movement data sets with the data base; and creating an animated image from the interaction of the movement data sets and the data base and producing a corresponding facial expression on said animated image.

21. An apparatus for providing data to a virtual reality computer system, comprising:

a plurality of movement data sets, each movement data set representative of movement of one of a plurality of facial regions on a user's face;

a transmission means for providing movement data from a cheek, an eye, a brow, a mouth, and chin; and a computing means for receiving the movement data sets and creating an animated image from the interaction of the movement data sets and a computer data base representative of a virtual image.

* * * * *